(12) United States Patent
Lavallee et al.

(10) Patent No.: US 7,478,018 B1
(45) Date of Patent: Jan. 13, 2009

(54) SYSTEM AND METHODS FOR NETWORK CALL LOAD SIMULATION

(75) Inventors: James E. Lavallee, Boylston, MA (US); Alexander Dubrovsky, Westborough, MA (US); Sean P. Frazer, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 524 days.

(21) Appl. No.: 10/955,964

(22) Filed: Sep. 30, 2004

(51) Int. Cl.
*G06F 17/10* (2006.01)
(52) U.S. Cl. .................. 703/2; 709/202; 709/224
(58) Field of Classification Search ............... 703/2, 703/15; 717/104; 379/27.02, 29.02, 266.03; 709/202, 201, 223–225; 707/102, 10, 200
See application file for complete search history.

(56) References Cited

U.S. PATENT DOCUMENTS

| | | | |
|---|---|---|---|
| 6,360,192 B2 * | 3/2002 | Dearth et al. ................ 703/15 |
| 6,639,982 B1 * | 10/2003 | Stuart et al. ............. 379/266.03 |
| 7,003,527 B1 * | 2/2006 | Lavallee et al. ............. 707/102 |
| 7,016,475 B2 * | 3/2006 | Resuta .................... 379/29.02 |
| 2003/0031302 A1 * | 2/2003 | Resuta .................... 379/27.02 |
| 2003/0167454 A1 * | 9/2003 | Iordanov et al. ............. 717/104 |
| 2004/0030741 A1 * | 2/2004 | Wolton et al. ............... 709/202 |

OTHER PUBLICATIONS

Hu et al., F. Multimedia call admission control in mobile networks: a dynamical reservation-pool approach, Computer Networks, vol. 43, Oct. 2003, pp. 263-288.*

Luo et al., J. Pan: Providing reliable storage in mobile ad hoc networks with probabilistic quorum systems, Proceedings of the 4th ACM International Symposium on Mobile ad hoc networking & computing MobiHoc '03, Jun. 2003, pp. 1-12.*

Simon et al., R. An agent architecture for network support of distributed simulation, 7th IEEE International Symposium on Distributed Simulation and Real-Time Applications, Oct. 2003, pp. 68-75.*

Chang et al., W.S. End-host multicasting in support of distributed real-time simulation systems, 37th Annual Simulation Symposium, IEEE, Apr. 2004, pp. 7-14.*

* cited by examiner

*Primary Examiner*—Russell Frejd
(74) *Attorney, Agent, or Firm*—Chapin IP Law, LLC; Barry W. Chapin, Esq.

(57) ABSTRACT

Configurations of the invention simulate an exchange of calls emanating from a SAN management application to a plurality of manageable entities. The simulated call load provides simultaneous simulated calls for observing and analyzing responses to various loading scenarios characterized by multiple pending calls to the SAN. Configurations discussed herein identify a processing work burden and corresponding completion time associated with each of the simulated calls. A simulation agent aggregates the work burden of concurrent requests and computes a latency factor associated with each call based on the load presented by all pending calls. By adjusting the latency time of each pending call, and adjusting the latency to represent the additional processing imposed by successive pending calls, the simulated responses provide an accurate set of responses, rather than merely returning an unencumbered rapid response of expected content which may elusively represent the actual timeliness of responses in a loaded system.

28 Claims, 9 Drawing Sheets

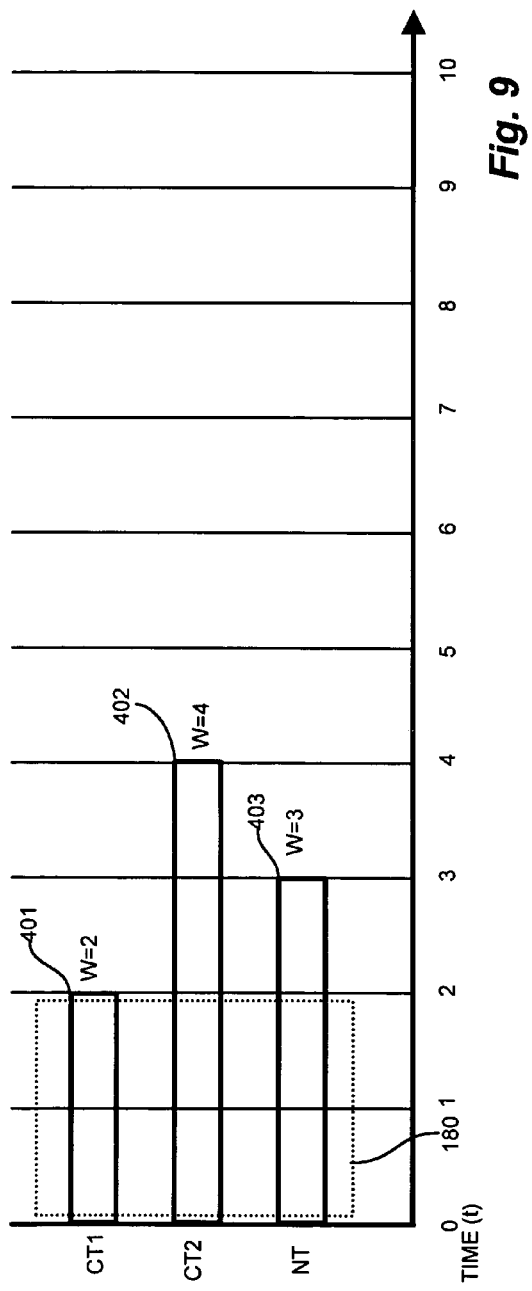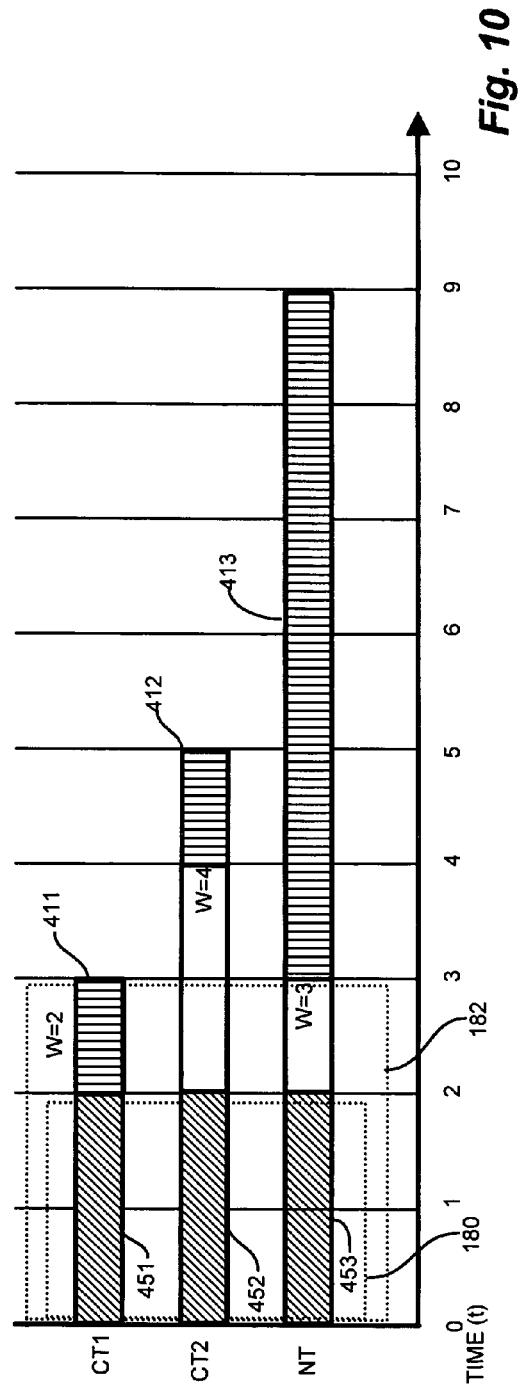

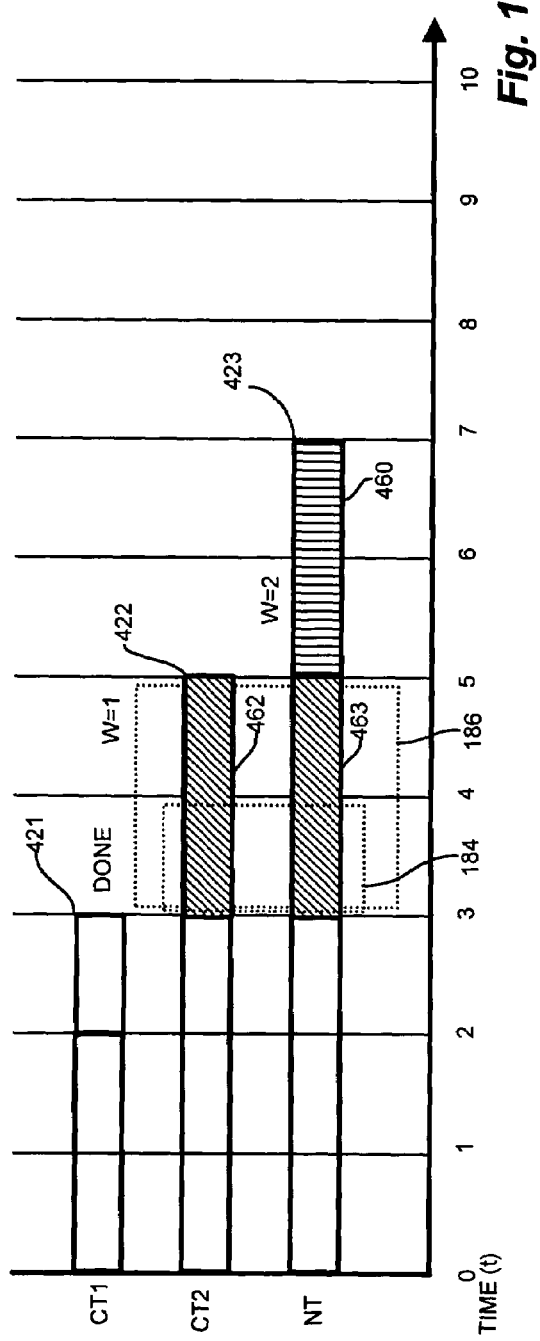
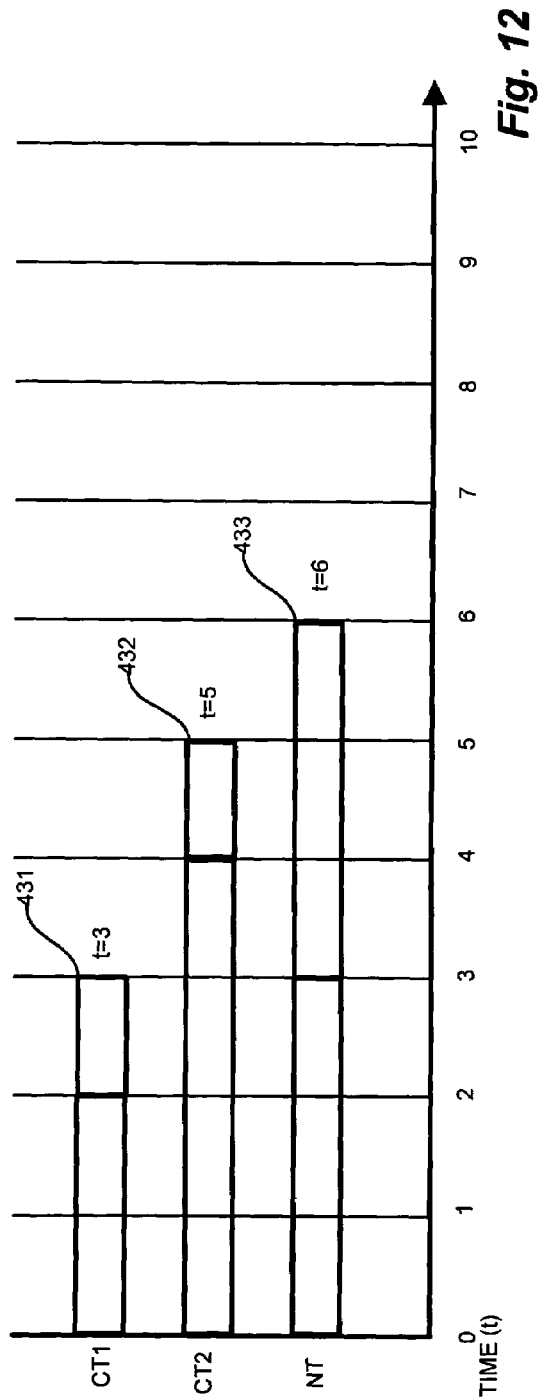

SYSTEM AND METHODS FOR NETWORK CALL LOAD SIMULATION

BACKGROUND OF THE INVENTION

Conventional managed information environments typically include a plurality of interconnected manageable entities, or nodes. In such an environment having a storage area network (SAN), the manageable entities may include storage arrays, connectivity devices and host entities, collectively operable to provide information storage and retrieval services to users. In a large storage area network, the number of nodes may be substantial.

In such a storage area network, software entities known as agents are responsive to a management application for managing the nodes in the SAN. The agents typically execute on a host computer and are in communication with manageable entities in the SAN responsive to the agent for providing configuration and status information, and for receiving instructions from the management application. In a typical conventional SAN, the agents manage and monitor a variety of manageable entities having different functions, and often emanating from different vendors. Further, connectivity, equipment changes and maintenance may affect the presence and status of the various manageable entities. Therefore, the configuration of the SAN may be complex and dynamic.

Accordingly, the SAN may adapt agents to a particular configuration in the SAN. The agents may be responsible for general tasks of a large number of nodes or manageable entities, or may have a more specialized role in handling a smaller number of specialized or vendor specific manageable entities. Nonetheless, the agent is communicative with the manageable entities for which it is responsible. Therefore, conventional SAN agents typically employ an application programming interface (API) conversant with a particular manageable entity and operable to manage and monitor the manageable entity.

Often, it is desirable to simulate the SAN for testing and development purposes. Simulation may avoid the need to duplicate a possibly large configuration of physical nodes. Simulation agents may be developed or modified to emulate the behavior of a storage array to the invoking SAN server. The conventional simulation agents may be configured with information similar to that which is available via the actual API employed for accessing the actual counterpart storage array. Therefore, a conventional server may be communicative with a set of simulation agents, each operable to receive requests and send responses emulative of an agent serving an actual storage array.

SUMMARY

In a storage area network, agents typically manage and monitor a plurality of manageable entities, or resources, by employing an application programming interface (API) known to both the agent and the manageable entity. As a typical conventional agent may manage multiple manageable entities, or manageable resources, an agent may employ a particular API specific to each manageable resource or type of manageable resource which it manages. Often, such conventional APIs are specific to a particular vendor of the type of manageable resource concerned. For example, a conventional SAN often employs a plurality of connectivity devices, or switches, between hosts and storage arrays. The switches manage the ports which physically interconnect the hosts and storage arrays for delivering data from the storage arrays to users. A typical agent may therefore be a switch agent operable to manage a plurality of switches, each from a different vendor. Therefore, the agent employs a particular device specific API corresponding to the switch of each vendor.

An agent, therefore, may employ an API having a set of interface modules, or so-called "plug-ins," each adapted to the switch of each particular vendor. Accordingly, each plug-in is operable between the agent and the particular switch. The plug-ins are operable to share a common set of commands or instructions (i.e. parameters) with the agent side of the API, and communicate in vendor specific parameters on the switch side. Each API typically employs multiple plug-ins to cover the switches which it manages. For each call to a switch, therefore, the API selectively employs the corresponding plug-in specific to the switch, such as a vendor specific or storage array type specific API.

In a SAN simulation environment, simulation agents emulate the operation of agents coupled to actual storage arrays, without requiring the actual use of the counterpart storage array. One particular configuration of SAN simulation is described in copending U.S. patent application Ser. No. 10/954,015 entitled "SYSTEM AND METHODS FOR STORAGE AREA NETWORK SIMULATION," filed Sep. 29, 2004, now U.S. Pat. No. 7,315,807, and assigned to the assignee of the present invention, incorporated herein by reference. In such a simulation environment, the simulation agent receives calls, or requests, made by a server, and responds with responses to simulate actual results emanating from the counterpart storage array.

However, conventional simulators respond in a predetermined manner to expected inputs, or calls. Such predetermined simulated responses typically do not need to actually perform the corresponding processing by a storage array which the responses purport to represent. Accordingly, conventional simulators may respond with a programmed response more quickly than the counterpart actual response.

In the SAN, however, requests or calls typically arrive on a demand basis from the server based on client requests. The order and frequency of such requests may be a variable subject to operator driven requirements. Such concurrent requests are often processed simultaneously by the recipient, such as the agent serving the storage array of which the request is made. A multitude of requests results in a load on the agent, and typically the agent prorates processing resources among the requests in a scheduled or context switched manner. In such a scheduled system under load, the response time of individual requests typically varies based on the total load, typically imposing a latency delay on the response proportional to the total pending call load. Accordingly, in a simulation scenario, it is beneficial to simulate a load of calls to the storage array.

Configurations of the invention are based, in part, on the observation that conventional simulations provide predetermined responses according to automated or preprogrammed logic. Such automated responses may occur much more quickly than their actual counterparts, particularly in a loaded system. Therefore, a barrage of simultaneous calls to a simulator may return more quickly than the same barrage of calls in the actual target system, possibly providing an inaccurate indication of the ability of the system to perform under load. The present invention substantially overcomes the shortcomings presented by such conventional simulations by identifying a processing work burden and corresponding completion time associated with each of the simulated calls (agent requests). The simulation agent aggregates the work burden of concurrent requests and computes a latency factor associated with each call based on the load presented by all pending calls. Accordingly, the simulation agent sends the corresponding responses from the simulation calls following the computed latency period. In this manner, the latency computation and associated latency extension of the response cycle provides an accurate view of the agent under load from a plurality of multiple competing requests contending for processing.

In the exemplary configuration discussed herein, the SAN simulator is operable to emulate a SAN agent receiving commands from a console and issuing calls to a simulated SAN represented by the emulated resource. Contention is an effect of multiple clients accessing the same target (proxy, Service Processor or switch) at the same time. Clients may use different interfaces for communication with the target, for example SNMP, SMI-S, native API. When multiple clients send requests to the same target via the same interface, the requests are usually serialized at the target port, meaning target processes the first request, and starts processing the next request only after completion of the previous one. Even if multiple clients use different interfaces, which may not necessarily become serialized, the requests have an effect on each other, since they compete on shared resources such as CPU. In either case, execution of the requests on the target gets delayed when multiple clients send requests at the same time.

Therefore, configurations of the invention substantially overcome the above described shortcomings with respect to observing configuration symptoms of large installations by providing a storage area network simulator operable to simulate an exchange of calls emanating from a SAN management application to a plurality of manageable entities, or resources, such as switches. The simulated call load provides simultaneous simulated calls for observing and analyzing SAN management application responses to various loading scenarios characterized by multiple pending calls to the simulated connectivity device. By adjusting the latency time of each pending call, and adjusting the latency to represent the additional processing burden imposed by successive pending calls, the simulated responses provide an accurate set of responses to the calls, rather than merely returning an unencumbered rapid response of expected content which may elusively represent the actual timeliness of responses in a loaded system.

In the exemplary SAN simulation environment discussed herein, one particular aspect of the contention simulation is to simulate the effect of contention on the performance of the clients accessing the target. Specifically, it is to estimate expected time of a task return in the contention environment.

Some tasks may be broken to multiple smaller requests or queries being sent to a target. For example, discovery of a switch port list via SNMP interface is broken to multiple SNMP queries being sent to a target one after another, while discovery of zoning via another interface may utilize a single large query to the target (i.e. host responsive to the call).

In the first approximation, the tasks can typically be divided to two groups:
  Non-breakable tasks
  Breakable tasks Non-breakable tasks are the ones that are executed utilizing one big query to the target. Breakable tasks are the ones that are executed utilizing multiple, usually light queries to the target. Another assumption is that all the low level requests or queries via the same interface processed by the target are serialized on the target. Requests via different interfaces to the same target are not serialized, but they compete on the shared resources, and the corresponding behavior becomes somewhat similar to breakable tasks.

To demonstrate behavior of contention with breakable and non-breakable tasks, consider the following examples. Two clients are performing almost simultaneous non-breakable tasks against the same target, while each task takes 10 seconds being executed separately. In this case, the first task query and the task itself will complete after 10 seconds, while the other task's query and the task itself will complete only after 20 seconds since the second task will commence execution only after completion of the first task.

Similarly to the previous example, let us assume there are two clients performing almost simultaneous tasks against the same target, while each task takes 10 seconds being executed separately. However, this time the tasks are breakable, which means the clients send many small queries one after another to the target.

In this case, the clients will send almost simultaneously the first query; the target will process the query from the first client and reply to it, then it will start processing the query from the other client. Meantime, the first client receives the response, and sends the second query to the target. The target starts execution of the second request from the first client after completion of the request from the second client, and so on. This way, queries from the two clients get interleaved on the target, which mean that tasks for both clients will complete after 20 seconds.

Significant aspects between breakable and non-breakable tasks are:
  The overall amount of work performed on the target is the same in both cases, which is 20 seconds in our examples.
  The last client always completes after the period required to perform the work for all clients together.
  The difference is in completion of the first task (or other pending tasks in case of more than two clients). In case of breakable tasks, all tasks complete at the same time assuming the clients perform equal tasks. In case of non-breakable tasks, the first client completes the task as it would run along (after 10 seconds in our example), followed by completion of the other clients' tasks up to the last client's task completion at the end (after 20 seconds in the above example). This exemplary configuration is also applicable to multiple threads running on the same client and performing tasks against the same target.

In further detail, the method of simulating responses to request calls includes receiving a call to perform a task by a simulation agent, and identifying currently pending requests already being processed as tasks and operable for concurrent processing by the simulation agent. The latency simulator employs scheduling logic to compute, based on the collective load burden of the identified currently pending requests, a completion time for the processing of the pending request, and recalculates, based on the received call, the completion time of the currently pending requests, therefore modifying the previously computed completion time of the pending requests to reflect new tasks. The latency simulator then transmits the response to the received task call at the recalculated completion time.

Further, the latency simulator may receive successive task calls requesting an associated response, recalculate the completion time of each of the currently pending requests responsive to the burden imposed by each of the successive tasks, and transmit the associated response for each of the currently pending requests at the corresponding computed completion time. Computing further comprises computing a contention period corresponding to a period of simultaneous processing by a set of tasks. Therefore, computing the completion time of the received task includes determining a contention period for each interval during which a fixed number of currently executing tasks are executing concurrently with the received task, and computing, for each contention period, the work burden completed for the received task by dividing the duration of the interval by the number of concurrent tasks and the received task contending for processing. The latency simulator, therefore, recalculates the completion time by identifying, for each contention period, the number of concurrent tasks, and extends the completion time for each of the currently executing tasks by dividing the processing for each contention period by the number of concurrent tasks.

In the exemplary configuration, the scheduling logic computes the contention period by identifying, from among the currently executing tasks, an end time of the earliest completing task and identifying the start time for the received task. The scheduling logic delimits the contention period by computing the interval from the start time of the received task to the end time of the earliest completing task, thus identifying the point at which the number of concurrent tasks changes. Identifying the end time of the earliest completing task further includes estimating an end time of the received task based on the number of currently executing tasks and the processing burden of the received task, and recalculating the end time of the currently executing tasks based on the additional processing corresponding to the received task. The scheduling logic then compares each of the end times of the received task and the currently executing tasks, and denotes the earliest of the compared end times as the end time of the earliest completing task.

In the exemplary configuration, recalculating the completion time includes determining the number of executing tasks including the addition of the received task, and computing, for each of the currently executing tasks, an amount of work performed in the contention section, or period. The latency simulator extends the completion time for each of the currently executing tasks based on the computed work performed during the contention section augmented by the new task. Since the newly received task and currently executing tasks are concurrently contending tasks, therefore, the scheduling logic determines the contention section indicative of a fixed number of concurrently contending tasks, and computes, for the determined contention section, an amount of work burden completed for each of the concurrently contending tasks. The scheduling logic then identifies the end of the contention section by the earliest completion of one of the contending tasks, and iterates the determining, computing, and identifying for successive contention sections until the remaining work burden for the received task is zero, i.e. the newly added task is completed.

In alternate configurations, the tasks further include non-breakable tasks, in which each of the non-breakable tasks is indicative of a set of sequential atomic operations, and the contention section corresponds to the processing of a current task of the currently executing tasks. Further, the processing may include allocating processing among the work burden of the currently pending tasks in equal time slices, or other suitable scheduling.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 9-12 are an example of a call latency scenario of multiple pending calls.

DETAILED DESCRIPTION

In a large storage area network at a customer site, customer reported symptoms of undesirable managed object operation may be difficult to recreate in a diagnostic setting, such as in a SAN management application test and development facility. A storage area network simulation operable to simulate a given configuration, such as a particular customer installation, allows observation and analysis of a particular SAN configuration under load, and also allows a maintenance engineer to analyze problems and develop and test remedial procedures, without physically reproducing such a large physical interconnection.

A storage area network simulator, disclosed further below, is operable to simulate an exchange of calls emanating from a SAN management application to a plurality of manageable entities, such as switches, for observing and analyzing SAN management application response to a particular configuration. A capture or gathering tool discovers manageable entities interconnected in a particular target SAN, such as the SAN experiencing undesirable operation. The gatherer delivers a range of exemplary calls to an agent, and gathers responses. The exemplary calls enumerate expected responses from the various manageable entities responsive to the agent. The gathered responses take the form of a normalized file, such as an XML markup script. An emulator plug-in is operative as a simulator interface module (e.g. plug-in) for a test agent in a test environment, such as the management application test facility. The test agent is adapted to employ the emulator plug-in as the API plug-in for calls emanating from the test agent. The emulator plug-in receives the normalized responses, and selectively transmits the corresponding response from the normalized responses in response to the corresponding agent call received via the API. Further, the emulator plug-in receives additional configuration data from the capture tool, such as latency timing information such that the emulator responses occur at substantially similar intervals as their counterparts in the symptomatic configuration.

Figure 1:
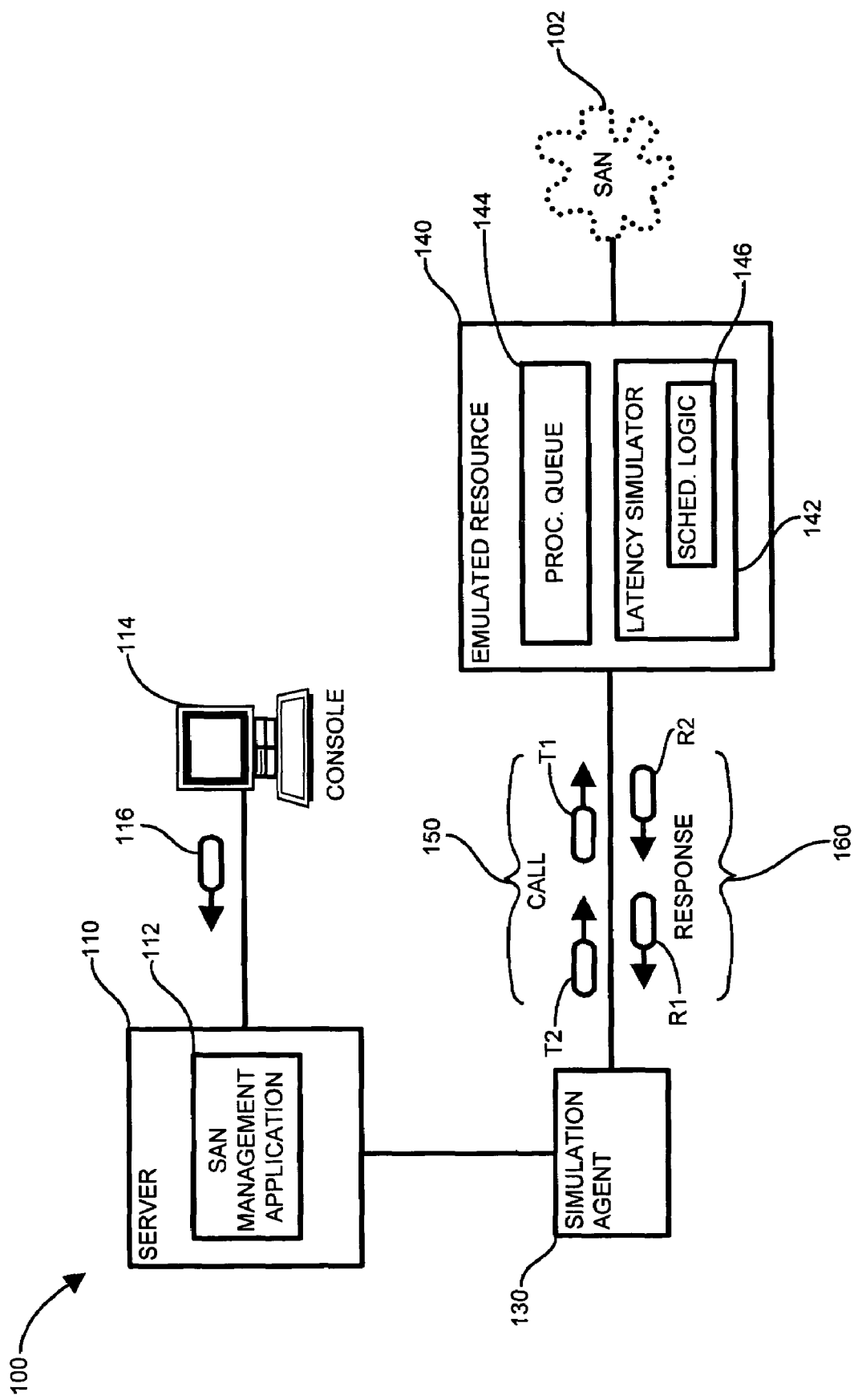
FIG. 1 is a context diagram of an exemplary managed information environment including a storage area network and suitable for use with configurations of the call load latency simulator in a storage area network.

FIG. 1 is a context diagram of an exemplary managed information environment including a storage area network and suitable for use with configurations of the call load latency simulator in a storage area network. Referring to FIG. 1, the managed information environment 100 includes a server 110 responsive to a user console 114 and coupled to agents 130, or manageable resources, interconnected in the simulated storage area network 102. In the exemplary arrangement discussed herein, the agent 130 is operable as a simulation agent, however the simulation agent 130 corresponds to a functional SAN host executing the agent as a simulation agent 130. Techniques for operating the agent 130 as a simulation agent are performed by employing an emulator plug in as described in copending U.S. patent application entitled: "SYSTEM AND METHODS FOR STORAGE AREA NETWORK SIMULATION," filed concurrently, incorporated herein by reference.

The server 110 receives commands 116 from the console 112, and effects the commands 116 via the simulation agent 130 responsively to a SAN management application 112. The agents 130 are typically software entities executing on hosts in the SAN 102 for maintaining and monitoring managed entities, or managed resources in the SAN 102. In a simulation environment, the emulated resource 140 simulates a managed resource, such as storage arrays, connectivity devices (i.e. switches), and databases. An agent 130 may manage a plurality of managed resources in the SAN, in which agents are typically assigned to manage resources having a common denominator such as a common vendor and/or type of manageable resource, described further in the above referenced copending patent application.

In the exemplary configuration, the emulated resource 140 emulates a manageable entity such as a switch, and includes a latency simulator 142 having scheduling logic 146 and a processing queue 144. From the perspective of the server 110 and simulation agent 130, the emulated resource 140 appears as one or more manageable entities in the simulated SAN 102. The simulation agent 130 sends a plurality of calls 150, indicative of simulated tasks T1 and T2 for processing by the emulated resource 140. The latency simulator 142 employs the scheduling logic 146 for computing a completion time for sending the responses 160 corresponding to each call 150, discussed further below. Responsive to the tasks T1 and T2, the emulated resource receives the tasks 150 in the processing queue 144, computes a completion time according to the scheduling logic 146, and sends responses R1 and R2 (160 generally) at the computed completion time of each.

However, this model achieves efficiency and simulation realism by apportioning the processing burden across the available processing resources according to the linear scheduling described in the exemplary configuration. Alternate scheduling mechanisms may be performed in alternate configurations.

Figure 2:
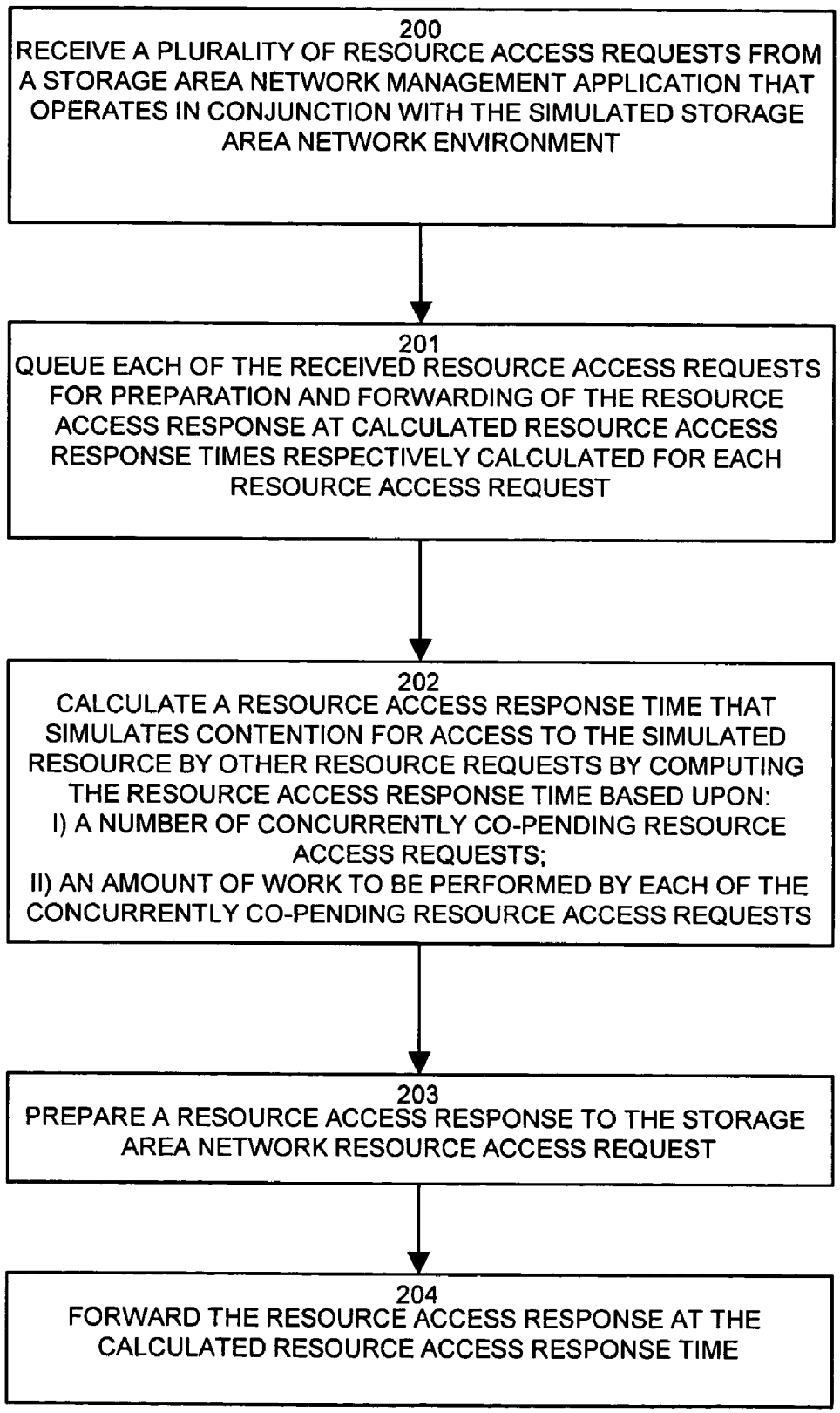
FIG. 2 is a flowchart of an agent employing the call load latency simulator.

FIG. 2 is a flowchart of an agent employing the call load latency simulator. Referring to FIGS. 1 and 2, the method for processing storage area network resource access requests according to configurations of the invention include receiving a plurality of resource access requests, such as calls 150, from the storage area network management application 112 that operates in conjunction with the simulated storage area network 102 environment via the agent 130 operating as the emulated resource 140, as depicted at step 200. The latency simulator 142 queues each of the received resource access requests (i.e. calls) 150 in the processing queue 144 for preparation and forwarding of the resource access response 160 at calculated resource access response times respectively calculated for each resource access request 150, as depicted at step 201.

The latency simulator 142 employs scheduling logic 146 for calculating a resource access response time that simulates contention for access to the simulated resource by other resource requests 150, as shown at step 202. As each additional request arrives, the processing resources are divided among the currently executing tasks T1, T2, thus extending the completion time for the currently pending tasks, discussed further below. The calculation of the resource access response time includes, in the exemplary configuration, computing the resource access response time based upon i) a number of concurrently co-pending resource access requests (i.e. tasks), and ii) an amount of work to be performed by each of the concurrently co-pending resource access requests, expressed as a work burden (W) of time to complete the task in an unencumbered system.

Upon expiration of the calculated completion time, the latency simulator 142 prepares a resource access response 160 to the storage area network resource access request 150, as depicted at step 203, and forwards the resource access response at the calculated resource access response time, as shown at step 204. The resource access response 160, as indicated above, simulates a response from a SAN resource, and may be predetermined according to the copending U.S. patent application cited above.

Contention simulation of the equal (i.e. similar work burden W) tasks from multiple clients started at the same time is straightforward. In case of the non-breakable tasks, the first one completes after time t, where t is the time required for a task to complete in a non-contention case, the second task completes after 2*t, and so on with the last (n'th) task completing after n*t seconds. In case of the breakable tasks, all tasks complete after n*t seconds. However, complexity increases for a case of different tasks 150 starting at different times.

The scheduling mechanism for non-breakable tasks is relatively straightforward as well. If a task starts at time Tstart, which normally takes t seconds to complete, and the target does not do anything, then it completes at time Tstart+t. If the same task starts at the same time, but the target is processing other non-breakable tasks, which we call pending tasks, while the last target pending task is to complete at time Ttarget-complete, then the task will complete at time Ttarget-complete+t. Note, that once a task completion time is determined, it never changes with more tasks coming in during execution of the pending tasks.

The scheduling logic for breakable tasks becomes more complex. One of the complexities is caused by the fact that completion time of the pending tasks (currently executed on the target or waiting the execution) gets affected by other tasks coming in the middle of the execution. We review what happens with the same tasks start time and duration as in the previous example, but here the tasks are breakable.

Particular aspects, discussed in further detail in the examples in FIGS. 3-4 below, are:

The scheduling logic 146 estimates completion time of the pending tasks upon arrival and updates the time with other tasks coming in during execution of the pending tasks 150.

When a task 150 comes in, it interleaves with other pending tasks 150 executed by the target 140. For example, at time 1, when a second task comes in, we know that it will be executed together with task one for some time until one of the two ends. At time 3, when a third task arrives in, there are already 2 tasks pending on the target. Now, three tasks get interleaved until one of them completes, after which the remaining two tasks remain interleaved until one of them completes, and then the remaining task completes the execution alone.

Interleaving of the tasks extends execution of all of them. In a particular example, until a second task started, an estimated time for completion of the first task was 4. When the second task started, time of execution of both tasks for the period of interleaving is twice as long, since the target processes requests from both tasks. As a result, execution time of both tasks gets extended by a factor of 2 for the duration of the contention section.

Similarly, when the third task joins, all three tasks get extended because of execution of three interleaved tasks for some period, and then execution of remaining two tasks is extended as well.

Interleaving of tasks affects the execution time as follows. If we have n tasks executed in parallel, when the new one starts, then execution time for the period of interleaving of all n+1 tasks gets extended by the factor of (n+1)/n for the pending tasks and by n+1 for the new task.

Figure 4:
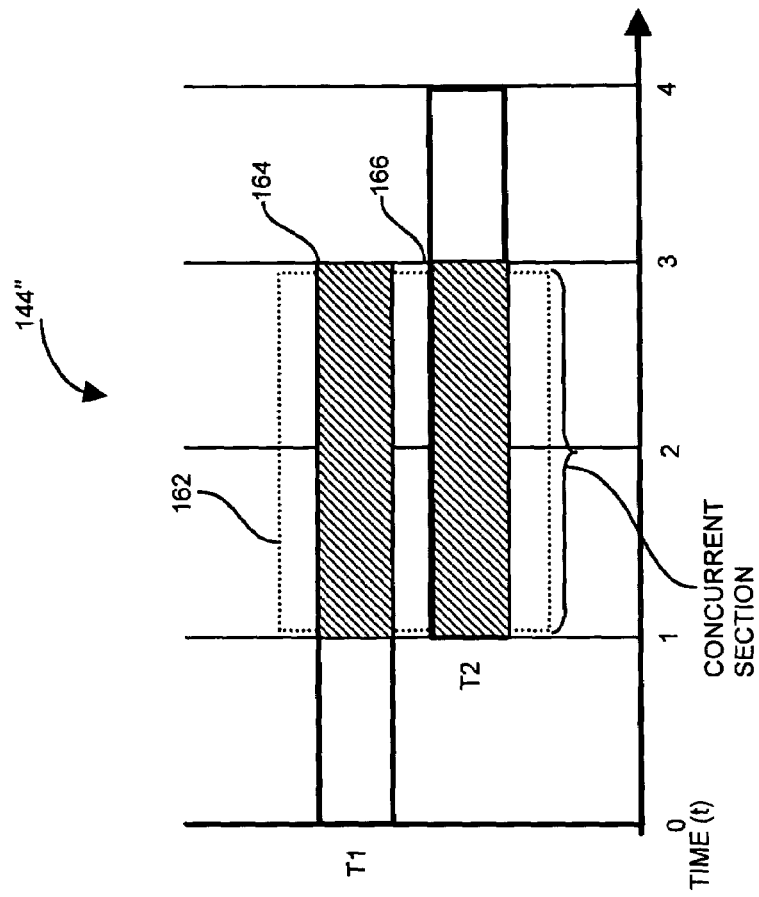
FIGS. 4-8 are a flowchart of the latency simulator of FIG. 1.
Figure 3:
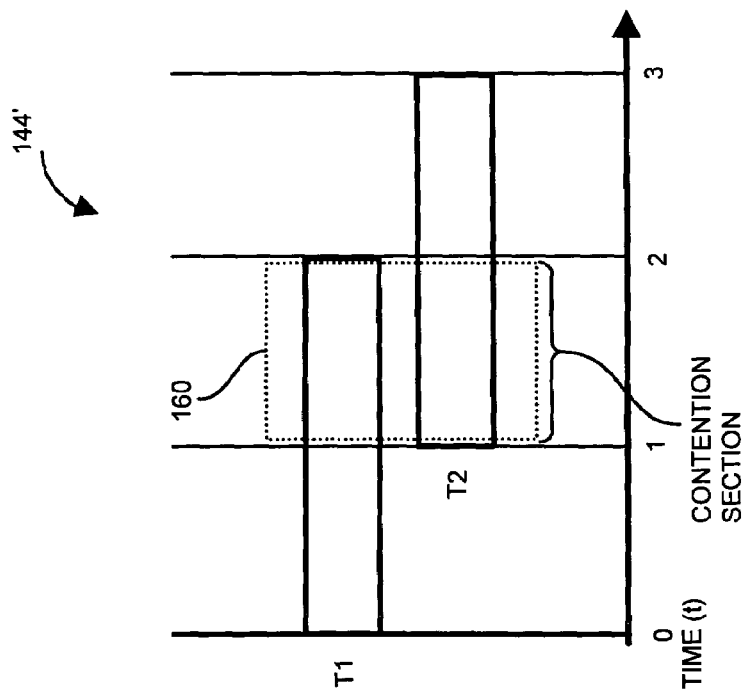
FIG. 3 is an exemplary timing chart of a particular configuration of the call load latency simulator showing a contention section.
Figure 5:
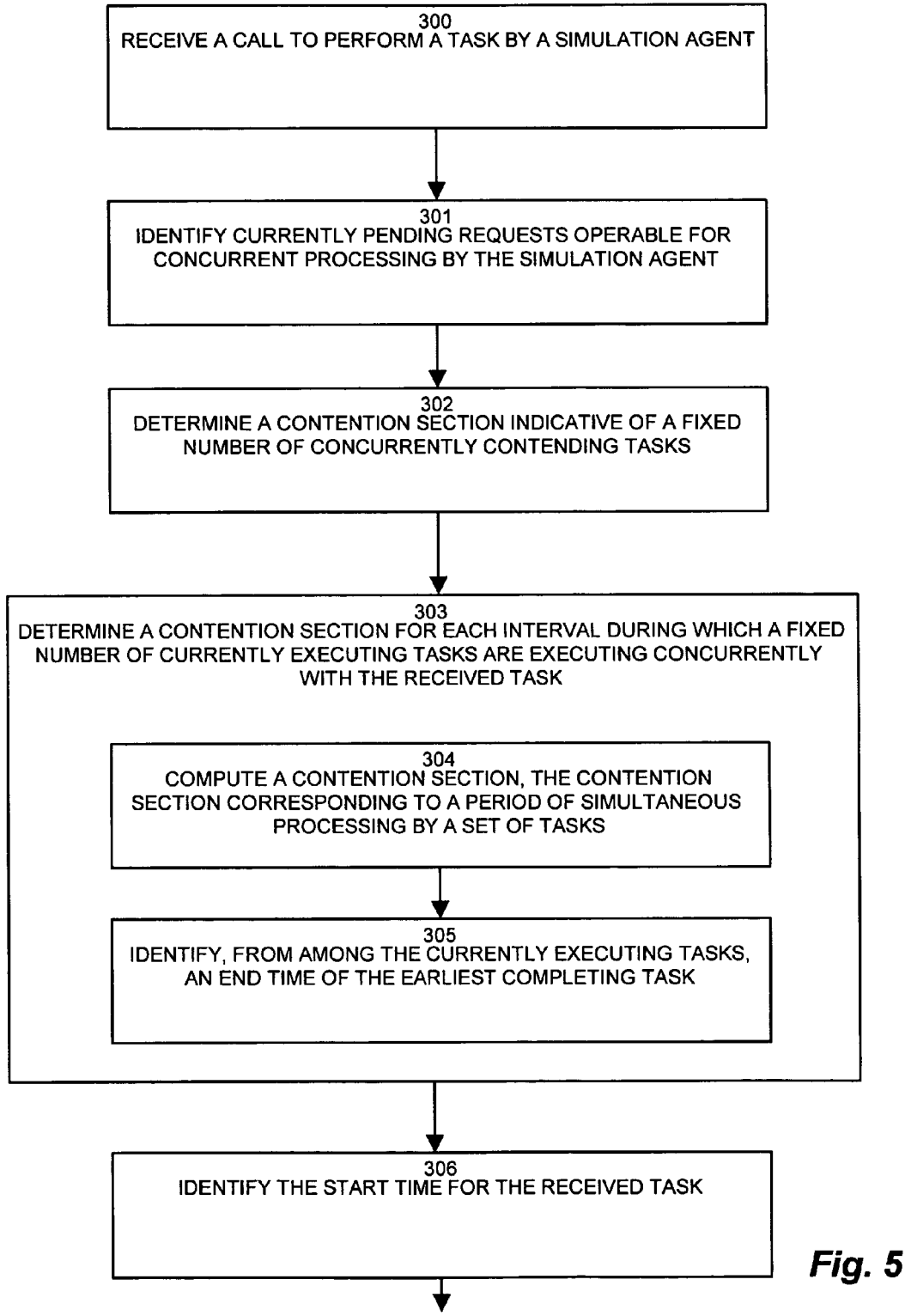
Figure 6:
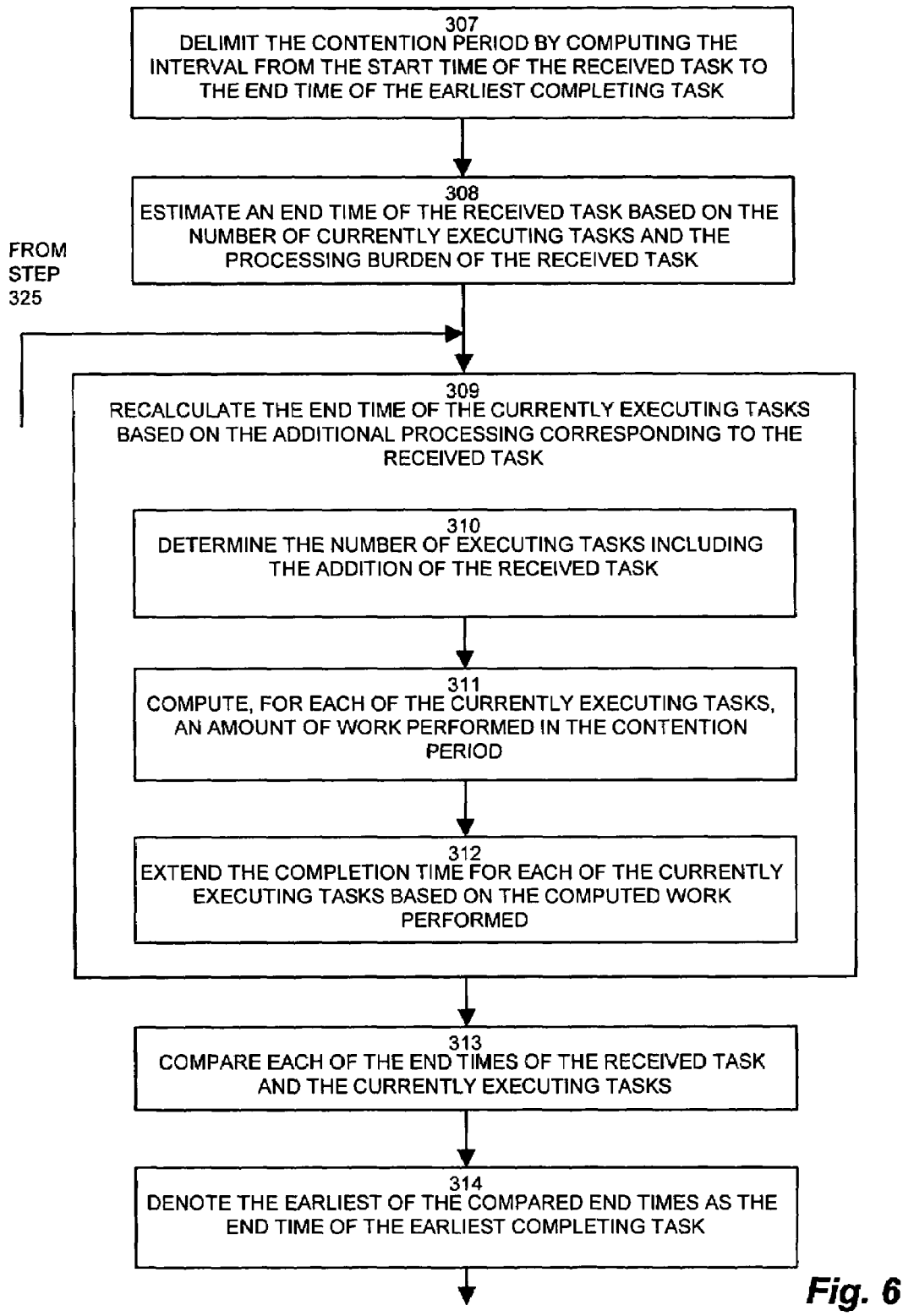
Figure 7:
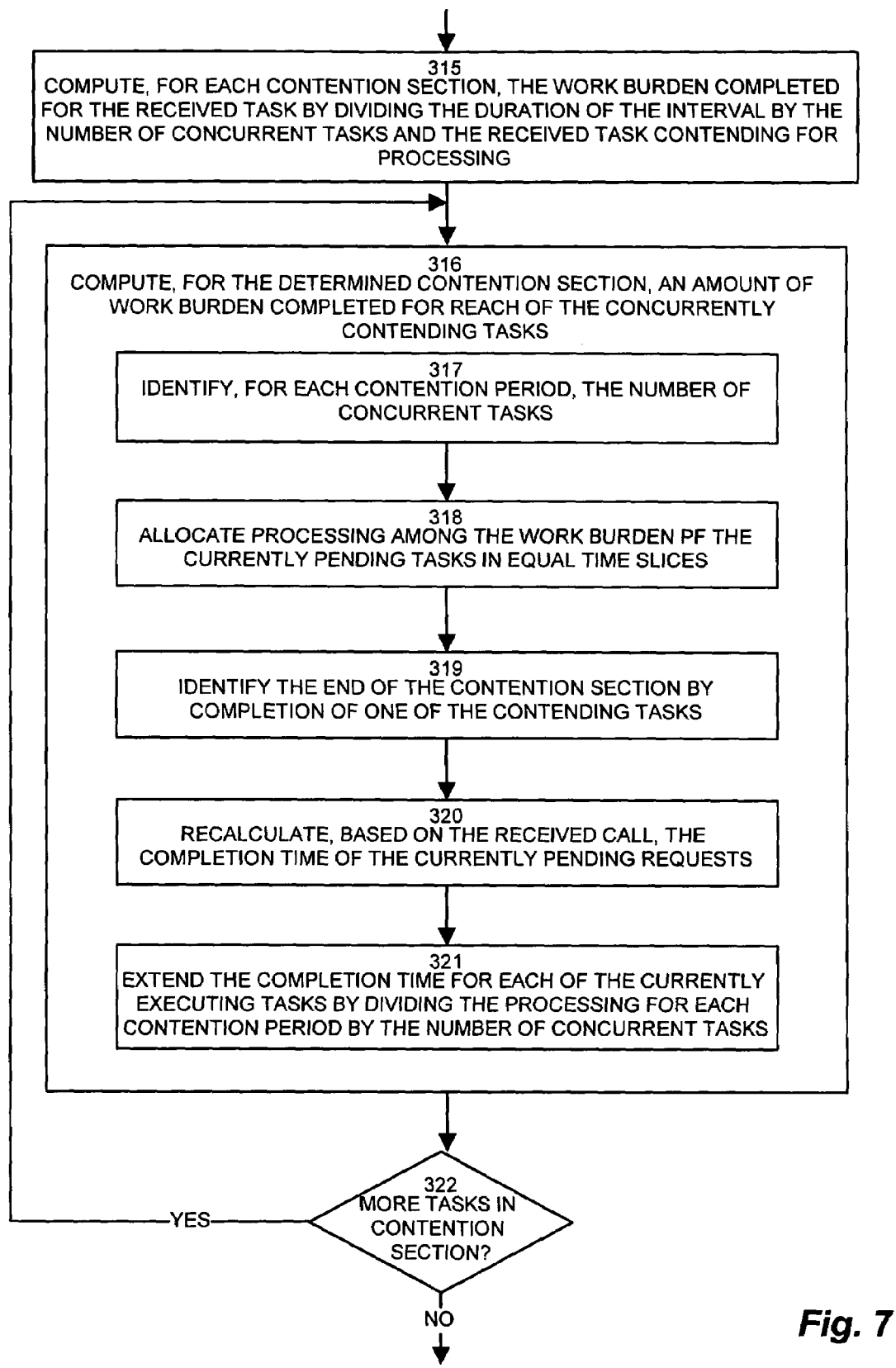
Figure 8:
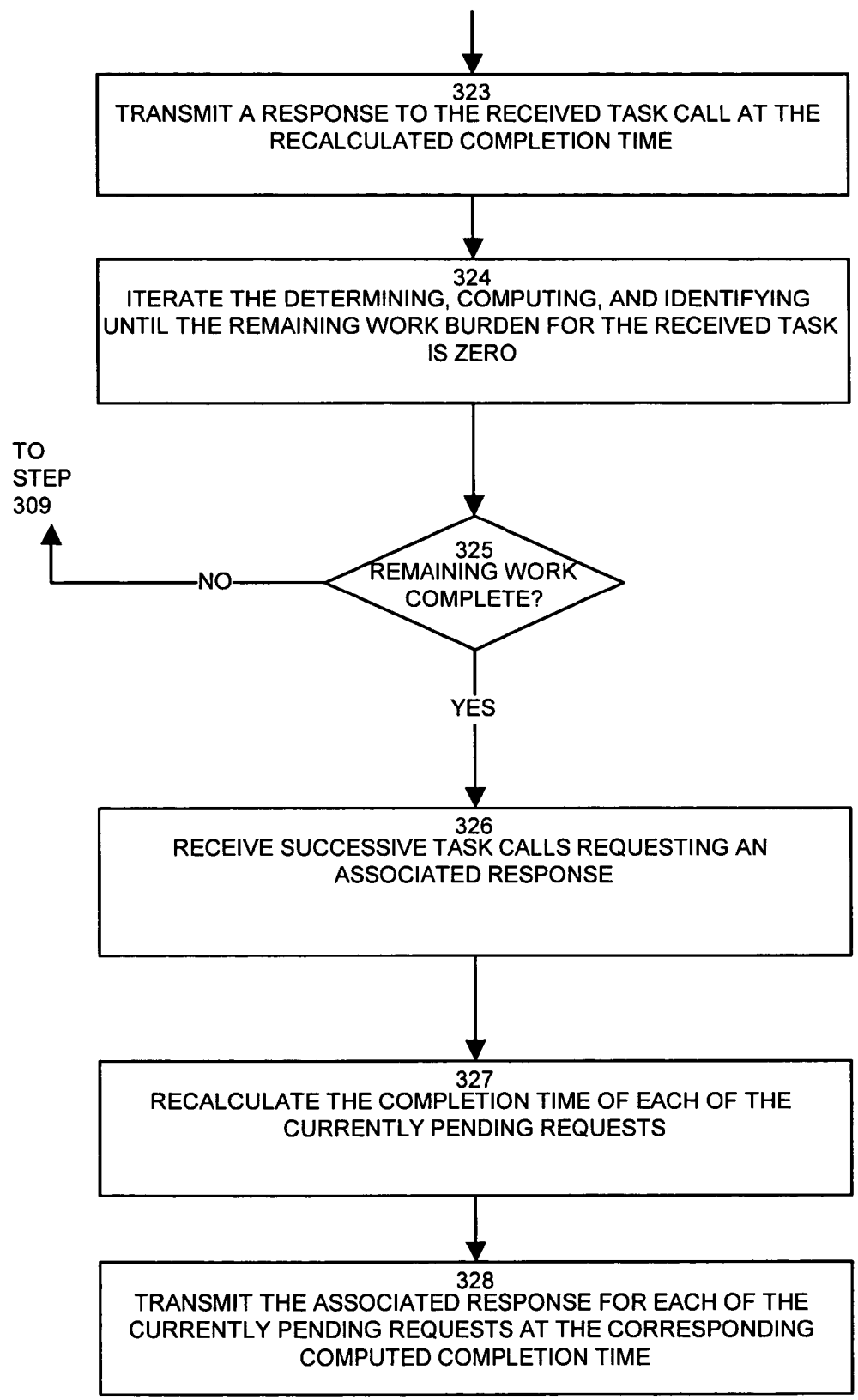

FIGS. 3 and 4 are an exemplary timing chart of a particular configuration of the call load latency simulator showing a contention section. Referring to FIGS. 1 and 3, exemplary calls 150 arrive as tasks T1 and T2. The arriving tasks 150 impose a processing burden expressed in time units for completion in an unencumbered system. The latency simulator 142 schedules task T1 at time 0 (t=0), requiring two processing units of time, and T2 at t=1, also requiring two minutes of processing time, in the processing queue 144'. At T=1, as T1 arrives, the latency simulator identifies T1 and T2 as currently pending. Accordingly, the latency simulator 142 identifies the contention section 160 as the time when the same number of concurrent tasks T1, T2 are executing.

The latency simulator 142 invokes the scheduling logic 146 to resolve the current contention section 160 and compute the revised completion time of T1 and T2 in view of the arrival of T2. For the duration of the contention section 160, the scheduling logic computes a concurrent section 162, effectively "stretching" the time of each task to represent the sharing of processing resources. Since T1 and T2 compete for processing resources, each task 150 receives 1/(number of tasks) or ½ of the processing. Accordingly, for the duration of the concurrent section 162 derived from the contention section 160, the scheduling logic 146 doubles the processing time of each task T1 and T2, shown by shaded areas 164 and 166. Accordingly, the scheduling logic 146 computes the new completion time of t1 as T=3, and the new completion time of T2 as t-4, effectively lengthening the duration by one time unit to correspond to the concurrent section 162 of two time intervals during which each received half processing attention. The scheduling logic 146 is discussed in further detail below as a general mechanism of computing the completion time for an arbitrary number of concurrent tasks.

Therefore, in other words, the scheduling logic 146 apportions the available computing resources among the contentious, concurrent tasks 150 in an equal time-slicing manner.

The simulated tasks represent breakable tasks, meaning that they need not be completed in a single continuous interval of processing time. Further, the scheduler performing the exemplary scheduling logic 146 does not assume a wait time such as may be incurred by a resource waiting, for example, for an external entity such as a disk drive or network port. Often, scheduling algorithms favor breaking, or swapping, tasks at a wait point to mitigate idle time by the processor. A scheduler operable of performing optimal context switching at a wait point, rather than equal interval time slicing, may provide faster results. Accordingly, the testing results provided by the latency simulator 142 is likely to provide test encumbrance at least as burdensome as the actual calls which it represents.

The exemplary contention section 160 is applicable more generally to an arbitrary number of concurrent tasks, rather than the two shown above. In order for the emulated resource executing in conjunction with the simulation agent 130 to adjust task completion time for tasks performed by different clients and contacting the same target, the latency simulator 146 operates as a simulator daemon, which accepts tasks from all the clients (e.g. simulation agents 130), and returns results to the clients after the estimated task execution time elapses. The latency simulator 146 maintains list of all the pending tasks per target, and the estimated completion time for each pending task. The daemon monitors completion times of the pending tasks, and returns to the caller after the estimated task completion time exceeds the current time, and the task gets removed from the list of pending tasks. Task estimated completion time of a pending task is first calculated when the task starts (task request arrives at the daemon), and then it is updated if necessarily every time new task request comes in, until the task returns to the caller.

The scheduling logic presented below applies to the calculation of the estimated completion time of the new task (NT) and recalculation of the estimated completion time of the pending tasks (CT1, CT2) at the time of the new task request coming in. The following labels apply:

W=amount of a new task work-time required for completion of the new task if there was no contention (this was t in the above sections of the document)

Contending tasks—pending tasks to be executed by the same target in parallel

N=number of currently contending tasks–number of pending contending tasks to the same target excluding the new request Contention section—period of time while the same set of tasks are executed by the target in parallel T=time duration of the contention section Tnew=updated duration of the contention section due to addition of the new task Tstart=start time of the contention section, which is equal to the start time of the new task for the first section Tend=end time of the contention section In the exemplary configuration, the scheduling logic 146 operates as follows:

While W (of the new task NT) is greater than 0

Find contention section starting at the current time (period of N+1 tasks executed in parallel)

The start time (Tstart) will be the new task start time. If there are no contending pending tasks, an expected completion time of the new task is simply Tstart+W. If there are other contending pending tasks, the following calculation applies The end of the section (Tend) will be the earliest end time of one or more of all the contending tasks, including the new request. To make the new task estimated end time comparable to the currently contending tasks, its end time is estimated here as Tstart+W*(N+1)

Current section duration time T=Tend−Tstart

The duration of this section (T) has to be adjusted since now N+1 tasks will be executed in parallel instead of original N tasks:

−Tnew=T*(N+1)/N

Update completion time for contending pending tasks based on the extension of the contention section, which will take now Tnew instead of the original T.

Completion time of all the contending pending tasks (excluding new task) gets extended by Tnew−T Update remaining work to be done for the new Task (W)

The Tnew/(N+1) amount of work will be done by the target for the new request during the contention section, since the section length is Tnew and N+1 tasks are being executed during this time, and the new task will get only 1/(N+1) slice of that time Tnew. The remaining work for the new task will be W=W−Tnew/(N+1)

Continue iterations on the contention section with the next one starting at Tstart=Tstart+Tnew FIGS. 5-8 are a flowchart of the latency simulator of FIG. 1, and illustrating the contention section discussed in the general method above. Referring to FIGS. 1 and 5-8, the latency simulator 142 simulating responses to requests by first receiving a call to perform a task by a simulation agent 130 as depicted at step 300, and identifying any other currently pending requests 150 operable for concurrent processing by the simulation agent 130 executing the emulated resource 140, as shown at step 301. As indicated above, the exemplary configuration executes the latency simulator 142 as a plug-in of device specific interfaces in an agent designated as a simulation agent 130, however alternate configurations may be employed. The latency simulator 142 maintains pending tasks in the processing queue 144 until the computed response time, or completion time, of the simulated task, at which time it responds with an emulated response 160.

The latency simulator 142 computes, based on the collective load burden of the identified currently pending requests, a completion time for the processing of the received task call by identifying the received task and currently executing tasks as concurrently contending tasks. The scheduling logic 146 then determines a contention section 160 indicative of the fixed number of concurrently contending tasks, as depicted at step 302. The contention section 160 is defined as the period of time (interval) during which the same tasks are executing, i.e. the newly arrived task and the currently pending N tasks yielding N+1 concurrent tasks, until the first of the N+1 tasks completes. Therefore, computing the completion time of the received task call further includes determining a contention period 160 for each interval during which a fixed number of currently executing tasks are executing concurrently with the received task, as disclosed at step 303. The latency simulator 142 computes the duration of the contention section 160 (period), in which the contention period corresponds to a period of simultaneous processing by a set of tasks, as depicted at step 304. Computing the contention section 160 further comprises identifying, from among the currently executing tasks, an end time of the earliest completing task, as depicted at step 305.

The contention section 160 runs through the end of the first completed task, as modified by the arrival of the new task to define the concurrency section 162. A new contention period then commences, until the completion time of the new task is computed. Other tasks will have had their completion times extend by each of the intervening contention periods, and may or may not complete before the new task, depending on the work burden remaining upon the arrival of the new task. Computation of the contention section 160, therefore, involves identifying the start time for the received task (the new task), as depicted at step 306, and delimiting the contention period by computing the interval from the start time of the received task to the end time of the earliest completing task, as shown at step 307. Identifying the end time of the earliest completing task first includes estimating an end time of the received new task based on the number of currently executing tasks and the processing burden of the received task, as shown at step 308. This estimation does not actually limit or set the completion time, it is simply used to compute the contention section duration which applies to compute the modification to the completion times, expressed as W*N (Work Burden of the new task * number of concurrently executing tasks). Typically, this estimation is a "worst case" analysis as it assumes that the new task succeeds all pending tasks in duration.

The latency simulator 142 then recalculates the end time of each of the currently executing tasks based on the additional processing corresponding to the received task, as depicted at step 309. Accordingly, recalculating further comprises determining the number of executing tasks including the addition of the received task, as shown at step 310. The scheduling logic 146 computes, for each of the currently executing tasks, an amount of work performed in the contention section 160. The contention section 160 is actually lengthened by the duration imposed by the new task to define an adjusted contention section, shown as the concurrency section 162. The scheduling logic 146 extends the completion time for each of the currently executing tasks based on the computed work performed as shown at step 312, and given by:

Tnew=T*(N+1)/N

To determine the earliest completing task, the scheduling logic 146 compares each of the end times of the received task and the currently executing tasks, as disclosed at step 313, and denotes the earliest of the compared end times as the end time of the earliest completing task, as shown at step 314.

After computing the concurrency section 162 denoting the contention section augmented by the work burden W of the new task, the scheduling logic 146 computes the work completed on behalf of the new task NT to determine the remaining work. Accordingly, the scheduling logic 146 computes, for each contention period, the work burden completed for the received task by dividing the duration of the interval by the number of concurrent tasks and the received task contending for processing, as depicted at step 315. Therefore:

W=W−Tnew/(N+1)

The scheduling logic 146 then computes, for the determined concurrency section 162, an amount of work burden completed for each of the concurrently contending tasks, as shown at step 316. This computation for recalculating the completion time includes identifying, for each contention period 160, the number of concurrent tasks, as disclosed at step 317, and allocating processing among the work burden of the currently pending tasks in equal time slices, as depicted at step 318. The scheduling logic 146 identifies the end of the contention section by completion of one of the contending tasks (i.e. the earliest to complete), as shown at step 319.

Based on this completion, the scheduling logic recalculates, based on the received call, the completion time of the currently pending requests, as depicted at step 320, and extends the completion time for each of the currently executing tasks by dividing the processing for each contention period by the number of concurrent tasks, as depicted at step 321.

A check is performed, at step 322, to determine if there are more tasks in the contention section update, and control reverts to step 316 until each currently pending task is updated. The scheduling logic 146 schedules transmitting a response to the current task call at the recalculated completion time for the task terminating the contention section, as shown at step 323. At the end of each contention section, a particular task has completed, and the scheduled termination, or completion time, marks the time at which the scheduling logic 146 sends the corresponding response 160. The latency simulator 142 continues iterating the determining, computing, and identifying until the remaining work burden for the received task is zero, as depicted at step 324, by recalculating the adjusted contention section, or concurrency section, resulting from the addition of the new task, for each contention section in the new tasks execution. Accordingly, at step 325, a check is performed to determine if there is work remaining for the new task, or if the work burden W has been incorporated into the currently pending tasks. If there is remaining work, control reverts to step 309 until the new task is complete.

At a successive time, the latency simulator 142 may receive successive task calls requesting an associated response, as shown at step 326. Recall that as the tasks are simulated, the latency computation occurs relatively quickly to reschedule the simulated response; it does not persist for the duration of the newly rescheduled responses. Accordingly, shortly after rescheduling to accommodate a particular new task (NT), another new task may arrive. In such a scenario, the latency simulator 146 recalculates the completion time of each of the currently pending task requests 150, as depicted at step 327, and transmits the associated response for each of the currently pending requests at the corresponding computed completion time, as disclosed at step 328.

In alternate configurations, as described above, the tasks further comprise non-breakable tasks, each of the non-breakable tasks indicative of a set of sequential atomic operations, wherein the contention period correspond to the processing of a current task of the currently executing tasks. Such sequential processing ensures that once execution has begun on a particular task, the processing is not prorated, or context switched, among the concurrent processes, but rather, copending tasks remain pending without completing any work burden W.

FIGS. 9-12 are an example of a call latency scenario of multiple pending calls using the method disclosed in the flowchart above. Referring to FIG. 9., a set of current tasks CT1 and CT2 have an expected duration (W) of 2 and 4 time units remaining, shown as scheduling bars 401 and 402, respectively. Note that as CT1 and CT2 are already pending, their burden may have in fact changed from inception into the processing queue by previous iterations of the mechanism described herein. The mechanism described herein recomputes the completion time, and hence the remaining time burden relative to the other pending tasks, upon each arrival of a task. Accordingly, at the exemplary time t=0, new task (NT) arrives with a work duration (W) of 3, in contention with CT1 and CT2, as shown by scheduling bars 401, 402 and 403.

Accordingly, t=0 becomes the new start time for this iteration. The arrival of the new task NT presents a contention section 180, during which 3 tasks CT1, CT2 and NT compete for processing. Referring to FIG. 10, this contention section 180 results in a concurrency section 182 for the duration of the simultaneous execution of these three tasks. The duration Tend is defined by the earliest end time of the three tasks. The duration of the new task NT is estimated as its work burden W * the number of concurrent tasks (including the new request) N+1, or:

$$\text{Tendnewtask} = \text{Tstart} + W * (N + 1)\\ = 0 + 3 * 3 = 9$$

which gives section termination times of 2, 4, and 9, as shown by scheduling bars 411, 412 and 413, respectively. The current contention section takes the earliest ending value, or 2, as Tend, as shown by shaded bars 451, 452 and 453. The current contention section duration is:

$$\text{Tend} - \text{Tstart} = \text{contention section end}\\ 2 - 0 = 2$$

Accordingly, the duration of the current contention section 180 is adjusted to determine the concurrency section 182 with the addition of the third task:

$$\text{Tnew} = T * (N + 1)/N\\ = 2 * (2 + 1)/2\\ = 2 * 3/2$$

Thus, the new contention section Tnew, or concurrency section 182 is 2*3/2, or 3 time units in duration.

The latency simulator 142 updates the completion time based on the new concurrency section 182 by Tnew−T, or 1, as shown by hatched areas 411 and 412 (the extension of the NT 413 was already estimated above). Next, the latency simulator computes the remaining work burden B for the new task NT by determining the work done during the concurrency section 182:

$$W = W - \text{Tnew}/(N + 1)\\ = 3 - 3/3\\ = 2$$

Thus, during the contention section 182, during which NT received ⅓ of the processing, 1 work burden unit was completed, leaving 2 remaining.

The next iteration begins at the end of the concurrency section (i.e. previous contention section) 182, at t=3, thus the task CT1 has completed 421 and only CT2 and NT compete. Referring to FIG. 11, each task completed 1 work burden unit in concurrency section 182, thus CT2 has 1 more to complete and NT has 2 work burden units W remaining, shown by scheduling bars 422 and 423. From t=3, the remaining estimated work for NT is:

W*(N+1)

2*2=4 as shown by hatched portion 460. Accordingly, the least work burden remaining is determined by CT2, having 1 unit, and denoting contention section 184. Computation of concurrency section 186 results from 2 tasks sharing the contention section, or $$\begin{aligned} \text{Tnew} &= T * (N+1)/N \\ &= 1 * (2)/1 \\ &= 2 \end{aligned}$$

so the concurrency section 186 extends the completion time by Tnew, or 2, as shown by shaded portions 462 and 463.

Therefore, at the completion of CT2 at t=5, the work performed on NT during the contention section is:

Tnew/(N+1)

2/(1+1)

or 1 work unit, leaving:

$$\begin{aligned} W &= W - \text{Tnew}/(N+1) \\ W &= 2 - 1 \\ &= 1 \end{aligned}$$

or 1 work unit to be performed on task NT. Since no other tasks have arrived, the remaining work unit is preformed uncontested from t=5, thus resulting in a computed termination time of task NT at t=6, shown by scheduling bar 433. As discussed above, tasks CT1 and CT2 completed at the end of the respective concurrency sections 182 and 186, as t=3 and t=5, as shown by scheduling bars 431 and 432.

In alternate configurations, contention may add less than expected 100% extension to the tasks execution time. For example, if we have two breakable tasks with original duration (amount of tasks work) of 10 seconds each, we would expect both tasks to compete after 20 seconds based on the algorithm presented above. In some cases, these two tasks complete in reality after 18 seconds. This could be explained by other overheads not directly affected by the contention, like networking overhead for example.

We introduce contention factor, which reflects the effect of contention to the execution time of contending tasks, and it is equal to Factor=(Real execution time−Task work)/(Expected execution time−Task work), or Factor=(18−10)/(20−10)=0.8 (80%).

In most of the cases, clients have timeout for tasks responds from the target. Since contention may cause extension of a task execution time, it can take much longer than usually expected without a contention and clients would start getting timeout errors. We simulate this affect of contention by maintaining timeout per interface, and returning the timeout error to the client if an expected task execution time becomes longer than the interface timeout value for non-breakable tasks. The task still remains in the list of pending tasks since the target continues its execution not realizing that the client does not wait for the result any more.

In the case of breakable tasks (SNMP task as an example), clients have timeout per low level requests, not per whole tasks. Since we don't model these low level requests, we can not formally simulate these timeouts too. Based on the empirical data we found that the SNMP targets can successfully handle many small low level requests, but start getting timeout with more than 2 clients sending heavier low level requests in parallel (SNMP zoning queries for example). We simulate this by generating timeout error for one of the clients when there are more than two clients executing breakable tasks with heavy low level requests (zoning tasks in our case).

The call load latency simulator mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for call load latency simulator as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer as executable instructions. The operations and methods may be implemented in a software executable object or as a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for storage area network simulation has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of simulating responses to request calls in a computer comprising:

receiving a call to perform a task by a simulation agent;

identifying currently pending requests operable for concurrent processing by the simulation agent;

computing, based on a collective load burden of the identified currently pending requests, a completion time for the processing of the received task call including determining a contention period for each interval during which a fixed number of currently pending requests are executing concurrently with the received task;

recalculating, based on the received call, the completion time of the currently pending requests; and transmitting a response to the received task call at the recalculated completion time, the computer responsive to the transmitted response for invoking instructions.

2. The method of claim 1 further comprising:

receiving successive task calls requesting an associated response;

recalculating the completion time of each of the currently pending requests; and transmitting the associated response for each of the currently pending requests at the corresponding recalculated completion time.

3. The method of claim 1 wherein computing the completion time of the received task call further comprises:

computing, for each contention period, the work burden completed for the received task by dividing the duration of the interval by the number of concurrent tasks and the received task contending for processing.

4. The method of claim 3 wherein recalculating the completion time further comprises:
identifying, for each contention period, the number of concurrent tasks; and
extending the completion time for each of the currently executing tasks by dividing the processing for each contention period by the number of concurrent tasks.

5. The method of claim 1 wherein computing further comprises computing a contention period, the contention period corresponding to a period of simultaneous processing by a set of tasks.

6. The method of claim 5 wherein computing the contention period further comprises:
identifying, from among the currently executing tasks, an end time of the earliest completing task;
identifying the start time for the received task; and
delimiting the contention period by computing the interval from the start time of the received task to the end time of the earliest completing task.

7. The method of claim 6 wherein identifying the end time of the earliest completing task further comprise:
estimating an end time of the received task based on the number of currently executing tasks and the processing burden of the received task;
recalculating the end time of the currently executing tasks based on the additional processing corresponding to the received task;
comparing each of the end times of the received task and the currently executing tasks; and
denoting the earliest of the compared end times as the end time of the earliest completing task.

8. The method of claim 7 wherein recalculating further comprises:
determining the number of executing tasks including the addition of the received task;
computing, for each of the currently executing tasks, an amount of work performed in the contention period; and
extending the completion time for each of the currently executing tasks based on the computed work performed.

9. The method of claim 1 wherein the received task and currently executing tasks are concurrently contending tasks, further comprising:
determining a contention section indicative of a fixed number of concurrently contending tasks;
computing, for the determined contention section, an amount of work burden completed for reach of the concurrently contending tasks;
identifying the end of the contention section by completion of one of the contending tasks; and
iterating the determining, computing, and identifying until the remaining work burden for the received task is zero.

10. The method of claim 9 wherein the tasks further comprise non-breakable tasks, each of the non-breakable tasks indicative of a set of sequential atomic operations, wherein the contention period correspond to the processing of a current task of the currently executing tasks.

11. The method of claim 9 wherein the processing further comprises allocating processing among the work burden of the currently pending tasks in equal time slices.

12. A method of simulating processing contention comprising:
receiving a new task
identifying pending tasks in concurrent contention with the new task calculating an estimated completion time for the new task;
calculating completion time for each of the pending tasks;
identifying a time until the earliest of the calculated completion time as the contention period;
extending the processing time of each of the current tasks during the contention period based on the addition of the new task;
computing remaining processing to be performed on the new tasks;
establishing, if there is no remaining processing to be performed on the new task, the end of the current contention period as the completion time for the new task; and
identifying the next successive termination of the new task and the pending tasks as the current contention period;
repeating the recalculating of completion times, extending the processing time, and computing remaining processing on the new task until the remaining processing on the new task is complete.

13. A method for processing storage area network resource access requests, the method comprising:
receiving a storage area network resource access request for access to a simulated resource within a simulated storage area network environment;
calculating a resource access response time that simulates contention for access to the simulated resource by other resource requests;
preparing a resource access response to the storage area network resource access request based on a contention period indicative of the calculated resource access response time; and
forwarding the resource access response at the calculated resource access response time.

14. The method of claim 13 wherein receiving a storage area network resource access request comprises:
receiving a plurality of resource access requests from a storage area network management application that operates in conjunction with the simulated storage area network environment;
queuing each of the received resource access requests for preparation and forwarding of the resource access response at calculated resource access response times respectively calculated for each resource access request; and
wherein calculating a resource access response time comprises:
computing the resource access response time based upon:
  i) a number of concurrently co-pending resource access requests;
  ii) an amount of work to be performed by each of the concurrently co-pending resource access requests.

15. A computing device for simulating responses to a request call load comprising:
a simulation agent for receiving a call to perform a task, the simulation agent operable as an emulated resource;
a processing queue operable for identifying currently pending requests operable for concurrent processing by the simulation agent;
a latency simulator operable for computing, based on a collective load burden of the identified currently pending requests, a completion time for the processing of the received task call; and scheduling logic in the latency simulator for recalculating, based on the received call, the completion time of the currently pending requests, the scheduling logic further operable to determine a contention period for each interval during which a fixed number of currently pending requests are executing concurrently with the received task, the latency simulator transmitting a response to the received task call at the computed completion time, the computing device responsive to the transmitted response for invoking instructions.

16. The computing device of claim 15 wherein the latency simulator is further operable to receive successive task calls requesting an associated response, and invoke the scheduling logic to recalculate the completion time of each of the currently pending requests, the latency simulator further operable to transmit the associated response for each of the currently pending requests at the corresponding recalculated completion time.

17. The computing device of claim 15 wherein the scheduling logic is further operable to compute, for each contention period, the work burden completed for the received task by dividing the duration of the interval by the number of concurrent tasks and the received task contending for processing.

18. The computing device of claim 17 wherein the scheduling logic is further operable to:
    identify, for each contention period, the number of concurrent tasks; and
    extend the completion time for each of the currently executing tasks by dividing the processing for each contention period by the number of concurrent tasks.

19. The computing device of claim 15 wherein the scheduling logic is operable to compute a contention period, the contention period corresponding to a period of simultaneous processing by a set of tasks.

20. The computing device of claim 19 wherein the scheduling logic is operable to:
    identify, from among the currently executing tasks, an end time of the earliest completing task;
    identify the start time for the received task; and
    delimit the contention period by computing the interval from the start time of the received task to the end time of the earliest completing task.

21. The computing device of claim 20 wherein the scheduling logic is operable to:
    estimate an end time of the received task based on the number of currently executing tasks and the processing burden of the received task;
    recalculate the end time of the currently executing tasks based on the additional processing corresponding to the received task;
    compare each of the end times of the received task and the currently executing tasks; and
    denote the earliest of the compared end times as the end time of the earliest completing task.

22. The computing device of claim 21 wherein the scheduling logic is further operable to:
    determine the number of executing tasks including the addition of the received task;
    compute, for each of the currently executing tasks, an amount of work performed in the contention period; and
    extend the completion time for each of the currently executing tasks based on the computed work performed.

23. The computing device of claim 15 wherein the received task and currently executing tasks are concurrently contending tasks, the scheduling logic further operable to:
    determine a contention section indicative of a fixed number of concurrently contending tasks;
    compute, for the determined contention section, an amount of work burden completed for reach of the concurrently contending tasks;
    identify the end of the contention section by completion of one of the contending tasks; and
    iterate the determining, computing, and identifying until the remaining work burden for the received task is zero.

24. The computing device of claim 23 wherein the tasks further comprise non-breakable tasks, each of the non-breakable tasks indicative of a set of sequential atomic operations, wherein the contention period correspond to the processing of a current task of the currently executing tasks.

25. The computing device of claim 23 wherein the scheduling logic is operable to allocate processing among the work burden of the currently pending tasks in equal time slices.

26. A computer program product having a computer readable medium operable to store computer program logic embodied in computer program code encoded as a set of instructions thereon which, when executed by a processor in a computer responsive to the instructions, cause the computer to perform steps for simulating responses to request calls comprising:
    receiving a call to perform a task by a simulation agent;
    identifying currently pending requests operable for concurrent processing by the simulation agent;
    computing, based on the collective load burden of the identified currently pending requests, a completion time for the processing of the received task call;
    recalculating, based on the received call, the completion time of the currently pending requests;
    transmitting a response to the received task call at the recalculated completion time;
    receiving successive task calls requesting an associated response;
    recalculating the completion time of each of the currently pending requests; and
    transmitting the associated response for each of the currently pending requests at the corresponding recalculated completion time, the computer responsive to the transmitted response for invoking instructions.

27. A computer program on a computer readable storage medium having program code including a set of instructions, which when executed by a computer, perform a method for simulating responses to request calls, the method comprising:
    receiving a call to perform a task by a simulation agent;
    identifying currently pending requests operable for concurrent processing by the simulation agent;
    computing, based on the collective load burden of the identified currently pending requests, a completion time for the processing of the received task call including determining a contention period for each interval during which a fixed number of currently pending requests are executing concurrently with the received task;
    recalculating, based on the received call, the completion time of the currently pending requests; and
    transmitting a response to the received task call at the recalculated completion time, the computer responsive to the transmitted response for invoking instructions.

28. A simulator device having program code on a computer readable storage medium, the code including a set of instructions, which when executed on a computer, perform steps for simulating responses to request calls to nodes in a storage area network comprising:
    means for receiving a call to perform a task by a simulation agent;
    means for identifying currently pending requests operable for concurrent processing by the simulation agent;

means for computing, based on the collective load burden of the identified currently pending requests, a completion time for the processing of the received task call including determining a contention period for each interval during which a fixed number of currently pending requests are executing concurrently with the received task;

means for recalculating, based on the received call, the completion time of the currently pending requests; and means for transmitting a response to the received task call at the recalculated completion time, the node responsive to the transmitted response for invoking instructions.

* * * * *